E. E. GOLD.
DEVICE FOR FASTENING WIRES TO PIPES.
APPLICATION FILED OCT. 23, 1913.

1,265,903.

Patented May 14, 1918.

WITNESSES:
René Bruine
T. F. Wallace

INVENTOR :
Edward E. Gold,
By Attorneys,
Fraser, Truhd & Myers

UNITED STATES PATENT OFFICE.

EDWARD E. GOLD, OF NEW YORK, N. Y., ASSIGNOR TO GOLD CAR HEATING & LIGHTING COMPANY, OF NEW YORK, N. Y., A CORPORATION OF NEW YORK.

DEVICE FOR FASTENING WIRES TO PIPES.

1,265,903. Specification of Letters Patent. Patented May 14, 1918.

Original application filed November 7, 1911, Serial No. 658,985. Divided and application filed January 3, 1912, Serial No. 669,272. Divided and this application filed October 23, 1913. Serial No. 796,877.

*To all whom it may concern:*

Be it known that I, EDWARD E. GOLD, a citizen of the United States, residing in the borough of Manhattan, city, county, and State of New York, have invented certain new and useful Improvements in Devices for Fastening Wires to Pipes, of which the following is a specification.

This invention relates to devices for fastening wires to pipes and is particularly designed with reference to providing means for fastening the end of a coiled radiating wire which is helically wound about the surface of a heating pipe, as a steam pipe, to such pipe. The invention is a division of application Serial No. 669,272, filed January 3, 1912, which was a division of a previous application filed by me November 7, 1911, Serial No. 658,985. A coil of radiating wire is frequently wound helically about a radiating pipe for the purpose of increasing the radiating surface. The end of such wire requires to be secured in some way to the pipe. This wire has been secured to the pipe by drilling a hole in the pipe in which the end of the wire was inserted and suitably secured, or in which hole suitable retaining devices for the wire were inserted. The drilling of such hole is apt to cause leaks in the pipe. It is expensive, weakens the pipe, and causes a loss of time. My present invention therefore aims to provide means for securing the end of such coiled wire in position upon the pipe which shall be located wholly upon the surface of the pipe, and the invention consists in securing to the surface of the pipe a metal part which I term an anchor to which the wire may be suitably attached. A desirable form in which my invention may be carried into effect is illustrated in the accompanying drawing, wherein,—

Figure 1:
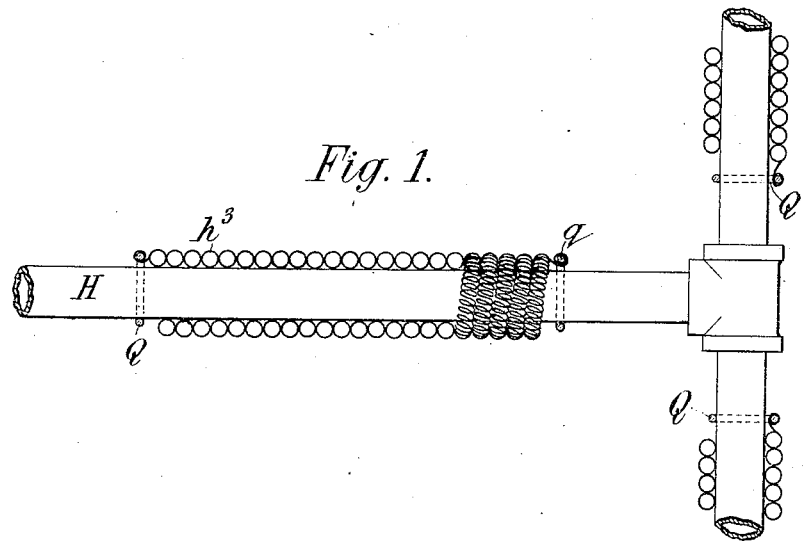
Figure 1 is a plan view of a portion of a heater pipe having such coil of radiating wire helically wound thereon.
Figure 2:
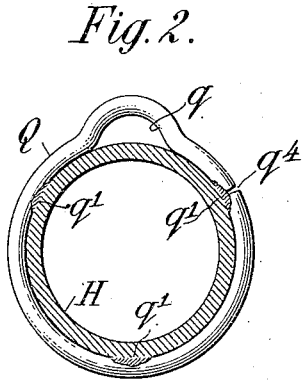
Fig. 2 is a cross-section of a pipe, illustrating an anchor applied thereto in accordance with my invention, said anchor being partly in section.

The pipe H, which may be a portion of a radiating pipe of a steam heating system or a pipe used for any other purpose, has wound helically about the outer surface thereof a coiled wire $h^3$. In accordance with my invention means are provided whereby the ends of the wire constituting such coil are secured in position upon the pipe, consisting of a metal anchor Q which is illustrated in Fig. 2 as being constructed in the form of a split ring or band split at $q^4$ and secured to the pipe by welding at points $q'$. The system of electric welding is very appropriate for this purpose. At $q$ the anchor Q has a portion bent outwardly into a loop with relation to the balance of the anchor, inclosing a space between said anchor and the pipe through which the end of the wire may be passed and the wire may then be fastened as by twisting on itself. The loop $q$ is closed on all sides by the anchor Q and by the pipe H. Fig. 1 illustrates the wire as secured beneath such portion $q$.

Preferably the anchor Q is secured to the pipe H by a plurality of welds $q'$, whereby said anchor is firmly held in position notwithstanding rough usage. I prefer to locate such welds one at each side of the loop $q$ and preferably one such weld will secure the meeting ends of the anchor.

My invention provides for holding the anchor in place upon the pipe against turning. It is, of course, obvious that the holding portion of the anchor $q$ is the only part essential to the performance of the function of anchoring the end of the wire and that the balance of the anchor is only present for the purpose of securing the anchor against movement. Therefore the part of the anchor not required to hold the same to the pipe or to receive the wire may be dispensed with, although I prefer the form shown.

What I claim is:—

1. A pipe and means for securing a wire thereto comprising a split metal band having a portion conforming to the surface of said pipe and having a portion bent outwardly therefrom forming a closed loop through which said wire may be passed, said band being secured to said pipe by being welded thereto on each side of said loop.

2. A pipe and means for securing a wire thereto comprising a split metal band having a portion conforming to the surface of said pipe and having a portion bent outwardly therefrom forming a closed loop through which said wire may be passed, said band passing around said pipe and having its meeting ends at a distance from said loop, and said band being secured to said pipe by welding one of such welds securing both said meeting ends thereto.

3. A heating pipe and a coil of radiating wire wound thereon, and means for securing the end of said wire to said pipe comprising a split band passing around said pipe having a portion extending outwardly from said pipe forming a closed loop adapted to receive the end of said wire, said band being welded to said pipe at each side of said loop.

4. A heating pipe and a coil of radiating wire wound thereon, and means for securing the end of said wire to said pipe comprising a split band passing around said pipe having a portion bent outwardly from said pipe forming a closed loop adapted to receive the end of said wire, said band being welded to said pipe at each side of said loop, and one of said welds securing both the meeting ends of said band to said pipe.

In witness whereof, I have hereunto signed my name in the presence of two subscribing witnesses.

EDWARD E. GOLD.

Witnesses:
HENRY M. TURK,
FRED WHITE.

Copies of this patent may be obtained for five cents each, by addressing the "Commissioner of Patents, Washington, D. C."